(12) United States Patent
Frehland et al.

(10) Patent No.: US 6,354,987 B1
(45) Date of Patent: Mar. 12, 2002

(54) FREE JET CENTRIFUGE

(75) Inventors: Peter Frehland, Ditzingen; Helmut Fischer, Remseck, both of (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/673,321

(22) PCT Filed: Apr. 16, 1999

(86) PCT No.: PCT/EP99/02584

§ 371 Date: Feb. 14, 2001

§ 102(e) Date: Feb. 14, 2001

(87) PCT Pub. No.: WO99/54051

PCT Pub. Date: Oct. 28, 1999

(30) Foreign Application Priority Data

Apr. 16, 1998 (WO) .............................. PCT/EP98/02219
Mar. 12, 1999 (DE) .......................................... 199 11 212

(51) Int. Cl.⁷ ................................................. B04B 9/06
(52) U.S. Cl. .......................................... 494/49; 494/83
(58) Field of Search ............................... 494/24, 36, 43, 494/49, 64, 65, 67, 83, 84, 901; 210/168, 171, 232, 360.1, 380.1, 416.5; 384/192–194; 184/6.24

(56) References Cited

U.S. PATENT DOCUMENTS

| | | | | |
|---|---|---|---|---|
| 2,650,022 | A | * | 8/1953 | Fulton et al. |
| 2,723,079 | A | * | 11/1955 | Fulton et al. |
| 2,865,562 | A | * | 12/1958 | Burke |
| 3,991,935 | A | | 11/1976 | Henning |
| 4,400,167 | A | * | 8/1983 | Beazley et al. ........... 210/360.1 |
| 5,096,581 | A | * | 3/1992 | Purvey ....................... 494/901 |
| 5,637,217 | A | | 6/1997 | Herman |
| 6,019,717 | A | * | 2/2000 | Herman ....................... 494/49 |
| 6,095,964 | A | * | 8/2000 | Purvey ........................ 494/83 |

FOREIGN PATENT DOCUMENTS

| | | | | |
|---|---|---|---|---|
| DE | 10 12 776 | | 7/1957 | |
| DE | 29 30 994 | | 2/1981 | |
| EP | 193 000 | | 9/1986 | |
| GB | 755 269 | | 8/1956 | |
| IT | 625621 | * | 9/1961 | .................. 494/49 |
| SU | 957 968 | | 9/1982 | |
| SU | 1017390 | * | 5/1983 | .................. 494/49 |
| SU | 1 576 206 | | 7/1990 | |
| WO | WO 91/09251 | | 6/1991 | |
| WO | 98/46361 | * | 10/1998 | |

* cited by examiner

Primary Examiner—Charles E. Cooley
(74) Attorney, Agent, or Firm—Crowell & Moring LLP

(57) ABSTRACT

A free jet centrifuge, especially for cleaning the lubricating oil of an internal combustion engine. The aim of the invention is to provide a centrifuge which is economical to manufacture and at the same time allows for high speeds. To this end on one side of the rotor a ball bearing (16) is provided in the housing which engages a closed stub shaft (14) of the rotor. In the area of this bearing the rotor is sealed so that friction in the ball bearing is not increased by the oil pressure in the centrifuge. A friction bearing is provided for the other side of the rotor which is composed of a slide bushing (20) and a bearing bushing (21). In this way a combination of materials which is optimal in terms of tribological properties can be selected. A hollow nipple shaft (19) which acts as an oil inlet (24) for the centrifuge rotor is inserted into the slide bushing (20). To increase speed even further, the invention provides for an impulse channel (30) which discharges through nozzles (31). This device is integrated into a plastic base of the rotor (13) which permits the production of highly precise drive nozzles (31).

12 Claims, 3 Drawing Sheets

FREE JET CENTRIFUGE

BACKGROUND OF THE INVENTION

STATE OF THE ART

The invention relates to a free jet centrifuge which has a rotor mounted for rotation in a housing.

Such free jet centrifuges are known. Their construction can be seen, for example, in EP 728 042 B1. An oil centrifuge is disclosed therein, as it is usually employed in the automotive field. It is made of sheet metal and consists of a plurality of sheet metal shells 1, 7 and 11 (see FIG. 1), which are attached together by beading. Furthermore, a central tube 2 is provided into which bushings 3 and 4 are pressed, which together with bearings in the housing form a friction suspension. The friction bearing is lubricated by the oil being centrifuged. The centrifuge is driven through bores 8 which are placed in the bottom 7 of the centrifuge rotor.

The centrifuge rotor described is a component which is made by low-cost large series production. For economical considerations in production, however, tolerances occur in the centrifuge rotor which for various reasons limit the maximum achievable speed. The openings 8, which can be made by drilling or punching, and which form the driving jets, are limited in their efficiency as drives by the imprecision of the openings. A certain friction occurs in the bushed bearings, which is produced mainly by the fact that the bearing bushes are not perfectly in line axially. Furthermore, a certain leakage occurs which leads to an uncentrifuged bypass of lubricant oil. Due to imbalances occurring in the centrifuge rotor the speed must be limited to some extent, since otherwise the stress on the bearings and the vibrations which the rotor applies to the housing increases excessively.

For an effective separation of the material being centrifuged, however, a high speed of the rotor combined with a low volume throughput of the fluid is necessary. Basically, the speed can be increased by providing larger openings 8, but this would at the same time increase the volumetric throughput, so that in spite of higher rotor speed the particles to be removed have less time to settle on the separating surfaces. Another possibility for optimizing the centrifugation effects consists in providing rolling bearings instead of friction bearings, as is proposed, for example, in DE 10 12 776. This is intended to reduce the bearing friction on the centrifuge rotor, so that higher rotor speeds can be attained. In that case, however, the problem arises that, due to the high pressure difference between the rotor interior and its surroundings (housing interior) a leakage occurs which flows through the rolling bearings. If this leakage should flow unhampered through the gap formed between the inner and outer races of the rolling bearings, not only would the oil losses become excessive, but also the bearing friction would be increased to such an extent that the friction advantage in comparison to friction bearings would be lost. Therefore an additional sealing of this gap must be provided. Encapsulation of ball bearings, however, is not possible, since due to the high pressure difference between the two sides of the bearing would be pressed so greatly on the bearing races that greater friction would be created than in the case of friction bearings.

The rolling bearing proposed in DE 10 12 776 is therefore combined with a friction bearing. The friction bearing provides for a reduction of the leakage and can be designed as a clearance fit so that the leakage simultaneously oils the bearings. During the operation of the centrifuge, however, the interstice between the races of the rolling bearings nevertheless become full of oil, so that the friction losses again increase unnecessarily. Also, the friction losses are increased by the two clearances, so that the resistence to rotation of the centrifuge rotor can be reduced but very little in this manner. Moreover, the solution also constitutes a definite increase in the cost of the centrifuge because the fit of the friction bearings must be achieved and the cost of the rolling bearings used must be dealt with.

SUMMARY OF THE INVENTION

The aim of the invention is to provide a free jet centrifuge which can be produced cost-effectively and will provide optimal results in regard to separation.

This aim is achieved by the invention as described and claimed hereinafter.

ADVANTAGES OF THE INVENTION

The free jet centrifuge according to the invention has a rotor which is journaled in a housing. The housing serves the purpose of protecting the environment from the centrifuged fluid issuing through the drive nozzles. At the same time no special housing bell needs to be provided for the centrifuge rotor. It is also conceivable to include this bell in a housing designed for other components. For example, the crankcase of an internal combustion engine or an oil filter module is a possibility, in which the centrifuge rotor is used as a secondary filter in addition to a mainstream filter element.

One of the bearing locations of the centrifuge rotor is simultaneously configured as an inlet for the fluid being centrifuged. This bearing location, in cooperation with a friction bearing, simultaneously offers a sufficient sealing of the liquid being fed to the housing interior. The other bearing is formed according to the invention by a rolling bearing. A ball bearing is one possibility. It is practical to place both bearing means on the two opposite sides of the top cover surface and the bottom surface, so as to minimize the bearing forces involved.

The bearing socket on the cover surface for the rolling bearing is sealed from the interior of the rotor. This can be accomplished, for example, by making the cover surface of the rotor closed and forming the journal shaft in one piece. In any case the journal shaft must be configured such that the fluid being centrifuged is not able to pass from the rotor interior to the housing interior. This has the important advantage that the rolling bearing is not exposed to any leakage on the centrifuge rotor. In order to lubricate the rolling bearing, the oil mist produced by the driving nozzles of the centrifuge rotor is entirely sufficient and even provides optimal lubricating conditions. The friction of the rolling bearing is therefore extraordinarily low.

In addition, an encapsulated rolling bearing can be used. Thus it can be shielded against contaminants in the fluid being centrifuged and can be lubricated for life before being put into operation. Of course, the frictional sealing point of the encapsulation must not be subjected to the oil pressure prevailing in the interior of the centrifuge since this would cause excessive bearing friction resulting in seizure. A sealed journal shaft on the rotor, in the manner already described, is thus also necessary in this variant.

The journal shaft can consist, for example, of a closed stub shaft which protrudes from the cover surface and is inserted into the inner race of the rolling bearing. Also conceivable is a concentric pocket in the cover surface into which the rolling bearing is inserted with its outer race. The stub shaft transfers the radial forces acting on the centrifuge rotor. If an appropriate selection of the rolling bearing is made, e.g., a ball bearing, the latter can absorb the axial forces which are caused by the oil pressure on the friction bearing, among other things.

An alternative solution of the bearing problem in the centrifuges described above is that at least one friction bearing is provided, the latter comprising a bearing bush and a sleeve bearing. The bearing bush is fastened in the housing. This can be performed by pressing it in, but other possibilities are conceivable, such as cementing or a threaded coupling. The sleeve bearing is inserted into the bearing bush and contacts a bearing journal which is provided on the rotor. The bearing journal simultaneously constitutes the inlet into the rotor for the fluid to be centrifuged. The bearing journal can consist, for example, of a hollow stub shaft which is inserted into the sleeve bearing. Also conceivable is a hole-like socket in the rotor into which the sleeve bearing can be inserted. In any case the sleeve bearing assures that the fluid to be centrifuged will be carried by the inlet channel system to the inlet on the rotor.

The fluid being centrifuged acts simultaneously as lubricant for the sleeve bearing. Here a slight loss due to leakage between the sleeve bearing and its counterpart is accepted, but the sleeve bearing is substantially a seal between the inlet and the housing interior surrounding the centrifuge.

A material match can be selected for the sleeve bearing and bush to give optimal results as regards the bearing properties of these components. The bearing bush can consist of bronze, for example, while the sleeve bearing is made from steel. Preferably, a relative motion between the sleeve bearing and bush is provided in the mounting of the rotor, while the connection between the bearing journal on the rotor and the bearing bush is to be stiff against torsion. For this purpose, however, the resistance of the sleeve bearing to torsion in the bearing journal needs to be only slightly greater than that between the bearing elements. This can be assured by simply setting the rotor into the bearing bush. The result is that it is easy to remove the centrifuge rotor, which is generally made as a replacement part. Thus the sleeve bearing can be advantageously reusable.

The described configuration of the sleeve bearing offers special advantages when the centrifuge is made of plastic, especially if the rotor is made entirely of plastic. The construction of such a plastic centrifuge rotor can be found, for example, in WO98/46361 (see FIG. 3 with corresponding description of the figure). Due to its unfavorable thermal expansion relative to other possible bearing components, plastic is not well suited for a direct mounting in a bearing bush. By interposing the sleeve bearing therefore a decided improvement in the long-term performance of the centrifuge mounting is realized, since small bearing clearances with low leakage loss can be provided. If the bearing journal on the plastic centrifuge rotor is formed by a hollow stub shaft, the attachment to the sleeve bearing can be achieved by simply plugging it in, as mentioned above. The fit between the hollow stub shaft and the sleeve bearing can be chosen such that relative motion is possible here as well, and the resulting friction should be greater than that between the pair of bushing components.

A desirable embodiment of the sleeve bearing provides it with a lock to prevent loss. This can consist, for example, of a flange provided on the end of the bushing remote from the rotor. This then prevents the sleeve bearing from slipping out of the bushing when the centrifuge rotor is replaced. Thus the rotor can be drawn out of the sleeve bearing if the connection between the rotor and the sleeve bearing is affected by greater friction than the combination of the two bushings, as is the case in the embodiment previously described. The replacement rotor can then be simply inserted into the sleeve bearing without the latter getting lost or wrongly installed. In this manner, therefore, the probability of error when exchanging the rotor is advantageously reduced. The worn-out rotor, if it is a component made entirely of plastic, can easily be disposed of thermally.

The idea of the invention can be further developed advantageously if at least one of the bearing components has three rotatory degrees of liberty with respect to the center point of the bearing. Of course, the first rotatory degree of liberty is the rotation of the centrifuge itself and must be provided in any case. The other two rotatory degrees of liberty permit the axis of rotation of the rotor to rock, the center of this rocking being the center point of the bearing. This, however, is not for the purpose of causing the centrifuge rotor to rock, but to be able to compensate without force any tilting of the centrifuge's axis of rotation due to tolerances. The rocking motion is prevented by the other bearing on the centrifuge.

The force-free mounting is necessary above all when friction bearings are used. Even minimal angular differences can here result in a severe increase in bearing friction leading even to seizure of the rotor. The additional rotatory degrees of liberty thus permit greater manufacturing tolerances both for the centrifuge rotor and for the housing. This has important advantages to the cost of the production of the said components. But even in the case of very precisely made parts, the embodiment according to the advantage can entirely prevent friction losses. The effect is an additional increase in the rotational speeds that can be attained by the centrifuge rotor. At the same time the desired nominal speed of the centrifuge can be achieved more reliably, since the differences in the friction levels of the bearings of some centrifuges are reduced.

The additional rotatory degrees of freedom of the bearing means can be achieved by a knuckle-joint-like configuration of the outer rings of the bearing, which are affixed to the housing. The pronounced center of the bearing, accordingly, is the center point of the ball containing the curved surfaces. For a bushed bearing it is then possible to make use of commercially available knuckle bearings as the bearing bushings. If rolling bearings are used, the possibility exists of making the outer race of the rolling bearing spherical or to have the bearing itself also contained in a knuckle joint, in which case the bearing is in engagement with the housing walls.

It is also advantageous to provide for axial play of the rotor in the bearing. If the rotor expands more greatly due to temperature fluctuations than the housing, this configuration prevents the rotor from exerting pinching forces on the bearings. More than anything else, this assures flawless, low-friction operation of the rotor in the constant operation of the centrifuge. Any rattling of the centrifuge due to bearing play during operation is prevented by the principle of its operation. The oil pressure produced inside of the centrifuge forces it during operation against the bearing that is at the end of the centrifuge remote from the inlet. This bearing must therefore also withstand axial forces. A ball bearing is therefore especially desirable. To limit axial free play, axial abutments can be provided on the centrifuge rotor. Of course, the rotor body itself can be used as an axial abutment since it has a greater diameter than the bearing journals.

An alternative solution to the problem of maximizing the highest rotatory speeds of a free jet centrifuge rotor is to be seen in making the bottom of the rotor in one piece of plastic, while in addition to the bearing journal for mounting means, at least one drive nozzle is integrated into the bottom. Construction from plastic permits a high-precision configuration of the nozzle opening, while its geometry can also be varied. The plastic rotor can be injection molded, and the nozzle openings can be integrated into the mold. Finishing operations on this part are then unnecessary, resulting in additional cost savings. Alternatively, the nozzle opening can also be drilled, in which case great precision can be achieved on account of the material selected. Injection molding also permits an additional free space for the nozzle geometric. The advantages can be achieved in known sheet metal bottoms only with great trouble, e.g., by using precision drilling, which is not economical especially when the centrifuge is to be used in the automotive field. Normally, the holes are punched or produced by standard boring.

The bearing journal can advantageously consist of a hollow stub shaft which is cast on the plastic bottom. The hollow stub shaft then also constitutes the inlet for the rotor and cooperates with a friction bearing like the one described above. The functional integration of various components in the bottom enables the cost of manufacture and assembly to be considerably reduced.

If a rolling bearing is to be used on the bottom, the bearing journal must be made, for the reasons already given, such that the rotor interior is sealing separated at this point from the housing interior. The inlet for the fluid to be centrifuged can then be provided at the other bearing point, for example.

An especially advantageous embodiment of the invention provides that an impulse channel be integrated in the bottom of the cover and be separated from the interior space by a channel covering on the inside of the cover. The fluid reaches the driving channel through inlet openings and is conveyed to the drive nozzle. The kinetic energy of the fluid particles is partially converted to rotatatory movement of the rotor. This enables an additional gain in the speed of the centrifuge rotor. This arrangement of the drive channel, however, has another advantage. The inlet opening to the drive channel is created near the centrifuge axis and is located on the bottom in the lowermost part of the centrifuge interior. Thus the dirt holding capacity of the centrifuge is increased to a maximum, since no quieting space needs to be provided in the intake are of the drive nozzles, which would reduce the holding capacity of the centrifuge rotor for separated material.

The speed increasing effect of the drive channel can be optimally used if its curvature is gradual. This means that by a continuous turning of the fluid from a radially outward direction of flow to a tangentially directed flow it produces a conversion of the jet to a rotary motion. This function can of course also be utilized even when, due to structural conditions, for example, a change of direction of less than 90 degrees is made in the drive channel. Even irregularities in the channel shape lead only to a reduction of the described effect.

The channel cover can be cemented or welded to the bottom. A desirable configuration of the inlet opening is achieved if it is arranged in a ring around a central tube reaching into the interior of the centrifuge. The central tube can advantageously also be integrated into the bottom. It then reaches into the interior of the centrifuge and can carry the fluid into the upper part of the rotor interior. From there it then flows back to the inlet openings on the drive channel, or if the latter is not provided, directly to the drive nozzles. The integration of the central tube into the bottom therefore results in an additional component integration which enhances the economical quality of the proposed solutions.

These and additional features of preferred embodiments of the invention will be found not only in the claims but also in the description and the drawings, the individual features being applicable individually or jointly in the form of subcombinations in embodiments of the invention and in other fields and may represent advantageous as well as independently patentable embodiments, for which protection is hereby claimed.

BRIEF DESCRIPTION OF THE DRAWINGS

Additional details of the invention are described in the drawings in conjunction with schematic embodiments.

DETAILED DESCRIPTION OF PREFERRED EMBODIMENTS

Figure 1:
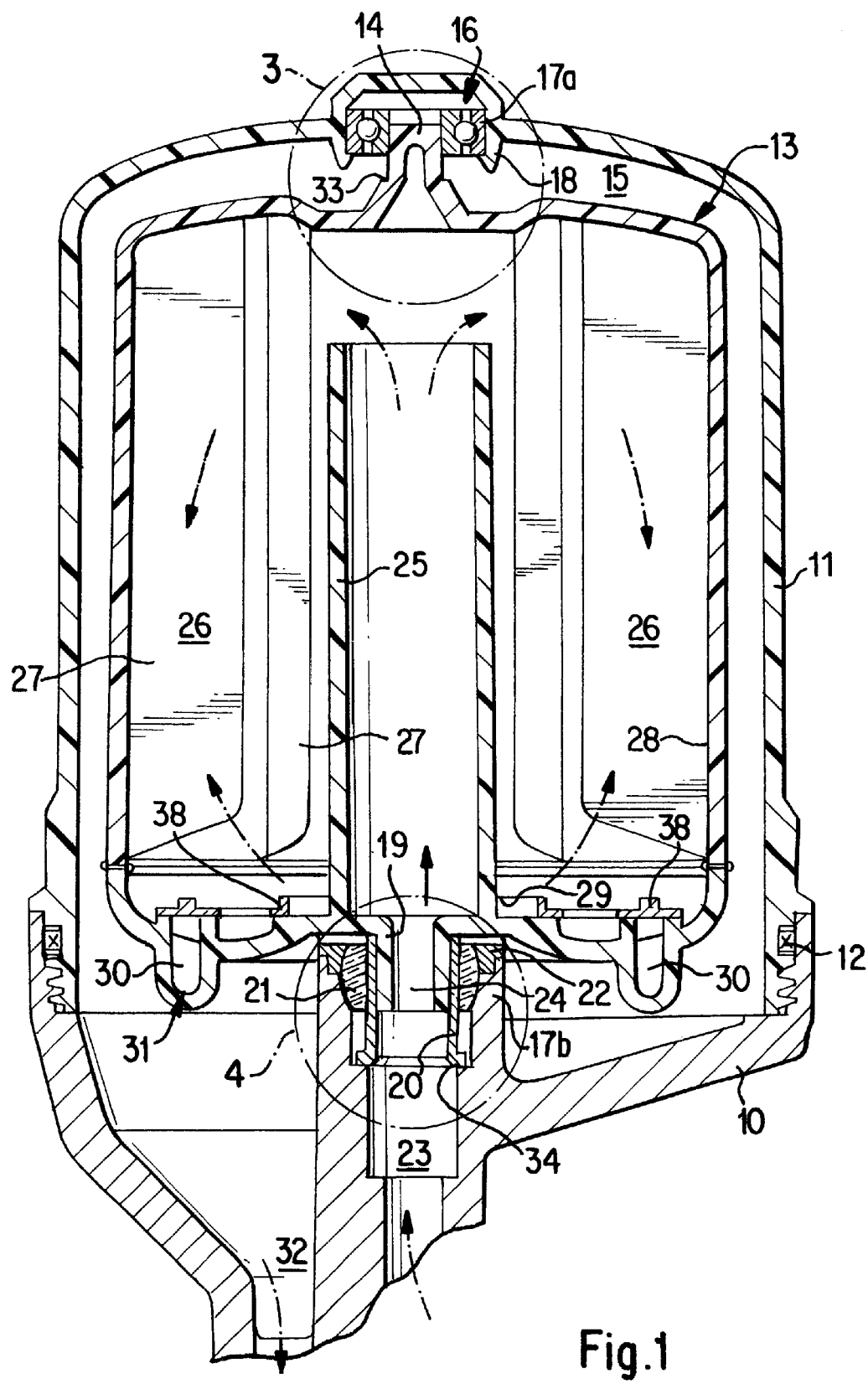
FIG. 1 shows a central section through an oil centrifuge with a plastic rotor and impulse channel, installed in a separate housing and journaled by a roller bearing and a sleeve bearing.

An oil centrifuge for the motor vehicle field is illustrated in FIG. 1. This centrifuge is contained in a housing comprising a housing base 10 and a housing bell 11. The two housing parts are screwed together and sealed by an O-ring 12.

A rotor 13 is journaled in the interior of the centrifuge housing. At one end of the rotor 13 an axial stub shaft 14 is provided for support. The latter is hollow but closed at the end so that a complete seal of the centrifuge interior from the housing interior 15 is assured. The roller bearing 16 is inserted into a housing socket or receptacle 17a and snap catches 18 which make use of the elasticity of the material of the housing bell assure the fixation of the roller bearing. When the rotor is replaced the ball bearing therefore remains in the housing bell and cannot be lost.

At the other end of the rotor a hollow nipple shaft 19 is provided. It is inserted into a slide bushing 20 which in turn rotates in a bearing bushing 21. The bushing has a curved exterior shape and is held in a mating housing socket 17b. To lock the bushing in place a securing ring or retainer 22 is provided, which is fastened on the housing socket 17b.

The oil to be centrifuged passes through an inlet duct 23 and reaches the friction bearing 20, 21, which seals the housing interior 15 from the inlet duct 23. The inflowing oil simultaneously provides for the lubrication of the friction bearing. From the friction bearing the oil passes through an inlet 24 in the hollow stub shaft 19 into the interior of a central tube 25 and is carried through its extremity into a sedimentation chamber 26 of the rotor. In the sediment chamber, guiding ribs 27 are provided between which there is a sediment deposition surface 28 formed by the inner walls of the rotor. The oil slowly flows to an annular inlet opening 29 which leads to impulse channels 30. In this period, particles are deposited on the sediment surface 28, while the ribs support the rotation of the oil inside of the centrifuge. Through the impulse channels the oil reaches drive nozzles 31 and is sprayed by them into the housing interior. In the housing base there is an outlet 32 for the cleaned oil. The direction of the flow of the oil is indicated by arrows.

The rotor 13 in the installed position has an axial free play in the direction of its axis of rotation, which is assured by the two bearings. At the axial stub shaft 14 there is an axial stop 33 limiting the upward movement of the rotor. In the friction bearing the axial free movement is assured by the shape of the slide bushing 20. This is made longer than the bearing bushing so as to permit axial movement of the rotor. A securing member 34, formed as an abutment at one end of the slide bushing, serves as a stop. This limits the axial movement of the bushing, by abutting at one end against the inlet duct 23 and at the other end against the bearing bushing 21. This also prevents the slide bushing from slipping out of the bearing bush and getting lost. The rotor 13 is shown in the axial position which it assumes in the state of rest. In operation the rotor is urged with its axial abutment 33 against the ball bearing 16, which simultaneously absorbs the axial forces that are created.

Figure 2:
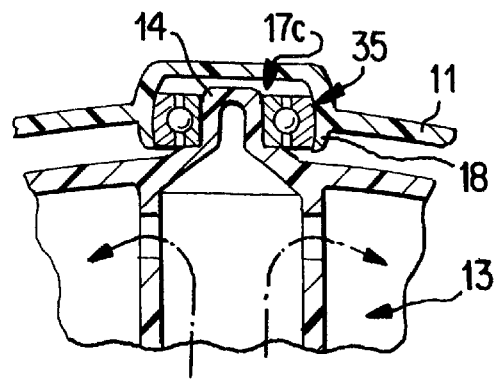
FIG. 2 shows an alternative embodiment of the roller bearing corresponding to the detail X seen in FIG. 1.

FIG. 2 shows the use of a ball bearing 35 with a convex outer race for mounting the axial stub shaft 14 in a socket 17c in the housing. This configuration prevents transfer of flexural movements from the axial stub shaft. This is accomplished by the knuckle joint by which it is held in the housing recess 17c. Snap catches 18 are provided as shown in FIG. 1 to fix the ball bearing 35 in the housing recess.

Figure 3:
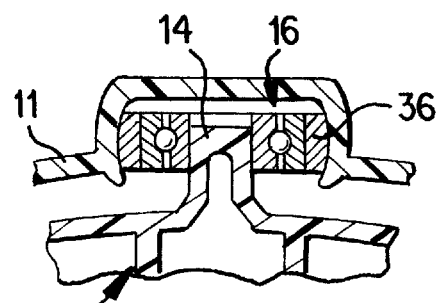
FIG. 3 shows an additional configuration of the roller bearing corresponding to detail X of FIG. 1.

The mounting of FIG. 3 operates according to the same principle as the mounting in FIG. 2. It shows the possibility of achieving a knuckle joint holding the ball bearing 16 by using a bearing mount 36 with a curved peripheral surface. The bearing mount corresponds to the spherical outer race of ball bearing 35.

Figure 4:
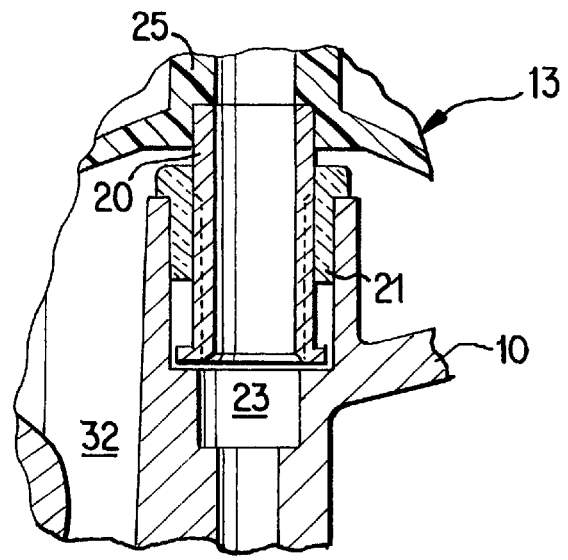
FIG. 4 shows an alternative configuration of the sleeve bearing, corresponding to detail Y of FIG. 1.

An alternative form of the friction bearing of FIG. 1 is shown in FIG. 4. The slide bushing 20 in this embodiment transfers flexural movements to the centrifuge shaft. The bearing bushing 21, which is made of bronze, is pressed into the inlet duct 23. The slide bushing 20, made of steel, is made longer than in the embodiment of FIG. 1 and is pressed into the interior of the central tube 25. The oil is delivered as described in FIG. 1.

Figure 5:
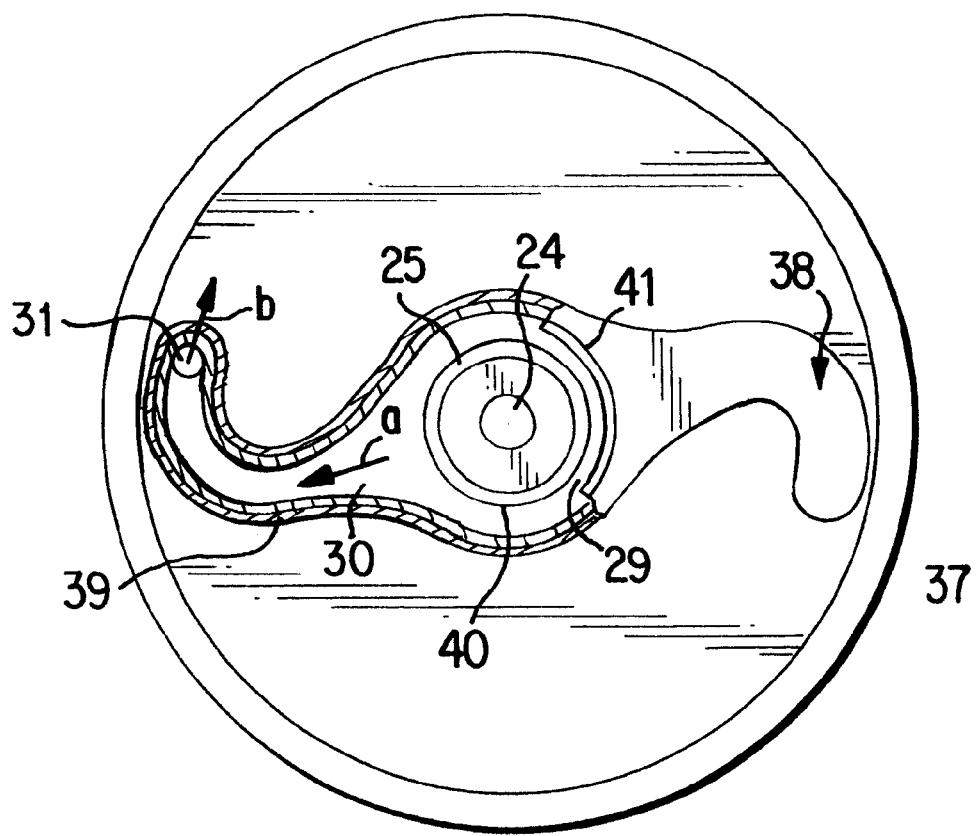
FIG. 5 shows a top plan view of the interior of the rotor bottom.

FIG. 5 shows an embodiment from which the configuration of the impulse channel 30 can be seen. A plan view of a rotor base 37 is shown, viewed from the inside outwardly. The inlet 24 leading into the interior of the center tube 25 is at the center. The impulse channel 30 is pressed into the base 37 and extends in a continuous curve from a radially outward direction of flow a to a tangential direction of flow b which simultaneously indicates the direction in which the drive nozzles 31 spray. The impulse channel is closed by a channel covering 38 (see also FIG. 1) shown partially cut away. The channel covering is vibration-welded onto the impulse channel. At the edge of the impulse channel a weld abutment 39 is provided for this purpose. The inlet opening 29 is formed by a gap between the outer wall 40 of the central tube 25 and a raised annular margin 40 on the channel covering 38.

We claim:

1. A free jet centrifuge for cleaning lubricating oil of an internal combustion engine, comprising a rotor having an inlet, at least one drive nozzle outlet, and a sediment deposition surface interiorly in said rotor; a surrounding housing for shielding the rotor from the environment; and bearing means for rotatably mounting said rotor in said housing, wherein said bearing means comprise a friction bearing which simultaneously forms said inlet, and a roller bearing which is optimized with respect to the bearing friction, said roller bearing being received in a bearing receptacle formed in the surrounding housing and being sealed off from the rotor interior.

2. A free jet centrifuge according to claim 1, wherein said bearing receptacle is sealed off by a closed axial stub shaft.

3. A free jet centrifuge according to claim 1, wherein said friction bearing comprises a slide bushing and bearing bushing, said bearing bushing being mounted in said housing, and said slide bushing being inserted inside said bearing bushing, wherein said slide bushing and said bearing bushing are made of materials with optimized friction bearing characteristics, and wherein a support for the bearing is connected to said slide bushing.

4. A free jet centrifuge according to claim 3, wherein said support for said bearing comprises a hollow nipple shaft on the bottom of said rotor, said hollow nipple shaft forming said inlet of said rotor.

5. A free jet centrifuge according to claim 3, wherein said slide bushing comprises a securing element for preventing the slide bushing from sliding out from the bearing bushing.

6. A free jet centrifuge according to claim 1, wherein said bearing means has three rotational degrees of freedom with respect to a center point of the respective bearing.

7. A free jet centrifuge according to claim 1, wherein said rotor is mounted in said bearing means so as to have axial play in said bearing means along the rotor axis of rotation, said centrifuge further comprising at least one stop for limiting axial movement of said rotor.

8. A free jet centrifuge according to claim 1, wherein the rotor comprises a one-piece base of synthetic resin material, said base having a bearing support for receiving a part of said bearing means, and at least one drive nozzle, each said at least one drive nozzle communicating with the rotor interior through a respective impulse channel formed in said base, said rotor further comprising a channel covering disposed over the impulse channel to separate the impulse channel from the rotor interior.

9. A free jet centrifuge according to claim 8, wherein said bearing support comprises a hollow nipple shaft which simultaneously forms the rotor inlet, and wherein said friction bearing comprises a slide bushing and a bearing bushing, and said hollow nipple shaft is engaged in said slide bushing of said friction bearing.

10. A free jet centrifuge according to claim 8, wherein said rotor further comprises an axial stub shaft journaled in said roller bearing received in said bearing receptacle in said housing, said axial stub shaft having a closed end so that the rotor interior is sealed off from the housing interior.

11. A free jet centrifuge according to claim 8, wherein said at least one impulse channel has a continuous curvature throughout an angular range of more than 45° in a plane of projection perpendicular to the rotor axis of rotation so that oil flowing through said impulse channel is turned from a radially outward flow direction to a tangential flow direction with respect to the rotor axis.

12. A free jet centrifuge according to claim 8, wherein a central tube is mounted on the rotor base with said rotor inlet opening into the bottom of the central tube and the top of the central tube opening into the rotor interior.

* * * * *